3,245,815
MOLDING COMPOSITION
John A. Hedge, Secane, Pa., assignor to Sun Oil Company, Philadelphia, Pa., a corporation of New Jersey
No Drawing. Filed Mar. 11, 1963, Ser. No. 264,081
1 Claim. (Cl. 106—202)

This invention relates to improved molding compositions containing asphalt as a binder.

In the past asphalts have been combined with many different types of filler materials to produce molding compositions. These compositions are usually molded into desired shapes by the application of high pressure and heat. It has also been observed that asphalts can be treated by chemical and physical processing to make more effective binders.

The object of this invention is to provide an exceptionally strong molding composition containing a cellulosic filler bound with a particular type of asphalt.

Asphalts are colloidal systems having a disperse phase and a continuous phase. The disperse phase, i.e. the micelles, comprises the component of highest molecular weight—known to the art as asphaltenes. They are solids. The continuous, or intermicellar phase, represents the components of lower molecular weight; and these are known as maltenes. They are non-solids. The maltenes are further divided for purposes of classification into a resin fraction and an oil fraction. One procedure for separating an asphalt into asphaltene, resin and oil components is described in Asphalts and Allied Substances, Abraham, third edition, 1929, pp. 756–758. Asphaltenes are often more specifically defined by noting the solvent used to separate them, e.g. naphtha asphaltenes, pentane asphaltenes and hexane asphaltenes.

I have found that the bottoms product resulting from the treatment of asphaltic residuum with a normally gaseous liquid hydrocarbon solvent contains a relative distribution of asphaltene, resin and oil components which renders the product uniquely suitable as a binder for cellulosic materials.

Briefly, the deasphalting process comprises feeding asphaltic residuum to a pressurized contact tank and treating the feed with propane, butane or a mixture of these two $C_3$–$C_4$ saturated hydrocarbons. The standard technique comprises countercurrent contacting of the downwardly moving feed with upwardly moving liquefied hydrocarbon solvent. Operating conditions include top tower temperatures of 120–210° F., a pressure range of 200–550 p.s.i. and solvent to oil ratios of 2.5/1.0 to 15.0/1.0 by volume. The usual feed for deasphalting has a boiling range of 800–1030° F., and A.P.I. gravity of from 11.0 to 16.0 and pentane insolubles of 5. to 15 vol. percent.

Deasphalter bottoms or raffinate resulting from contacting at the above conditions with a solvent containing 85 vol. percent propane and 15 vol. percent butane had the following properties and composition.

| | |
|---|---|
| Specific gravity, 60°/60° | 1.067 |
| Penetration: | |
| at 77° F. | 2 |
| at 115° F. | 2 |
| Softening point (R. & B.) ° F. | 195 |
| Pentane insoluble (vol. percent) percent | 26.0 |
| Resins (vol. percent) do | 25 |
| Oils (by diff.) do | 49 |
| $CCl_4$ sol. | 99.8 |
| Conradson carbon | 32.0 |
| Viscosity (Saybolt Furol seconds): | |
| at 275° F. | 2980 |
| at 350° F. | 253 |
| at 400° F. | 71 |

This material was used as the binder in the examples which follow. Suitable $C_3$–$C_4$ solvent deasphalter bottoms for use in the molding compositions of the invention are those having asphaltene contents ranging from about 20 to about 30 wt. percent and resin contents of 20–30 wt. percent. At least 20 wt. percent resins and less than 30 wt. percent asphaltenes are present in the binder.

The following examples show the results of binding paper with the binder of the invention. Wood chips, wood flour, sawdust, straw, cornstalks, cotton fibers, cellulose floc, bagasse and mixtures of these and other cellulosic and ligno cellulosic materials can be used as well. From 50 to 90 wt. percent filler can be used.

In the following examples test blanks were prepared by thoroughly mixing the binder with ground paper and molding the mixture in a Carver press at a pressure of 4000 p.s.i. and a temperature of 155° F. Molded blanks having dimensions of 1 x 4 x ⅛ inches were then tested on a center-loading apparatus employing the procedure outlined in ASTM D1037–56T (modified).

The results were as follows:

TABLE I

Test strips molded from paper and asphalt fractions

| No. | Binder | Percent Binder | Percent Paper | Molding Temp. (° F.) | Molding Pressure (p.s.i.) | Modulus of Rupture at Room Temp. (p.s.i.) |
|---|---|---|---|---|---|---|
| 1 | Propane-Butane Bottoms | 50 | 50 | 155 | 4,000 | 3,480 |
| | | 33 | 67 | 155 | 4,000 | 3,800 |
| | | 21 | 79 | 155 | 4,000 | 4,275 |
| 2 | Hexane-Precipitated asphaltenes. | 33 | 67 | 200 | 4,000 | 2,280 |
| 3 | Pentane-Precipitated asphaltenes. | 50 | 50 | 275 | 5,000 | 2,580 |
| 4 | 100% Paper | | 100 | 275 | 5,000 | 1,320 |

The test blanks of Examples 2 and 3 contained at least 50 wt. percent asphaltenes. These had only about 70% of the modulus of rupture of the molding composition of the invention. These data clearly show the superiority of molded compositions comprising a cellulosic filler and deasphalter bottoms containing a balanced proportion of asphaltenes and resins.

It is to be understood that the foregoing detailed description is given merely by way of illustration and many alterations can be made therein without departing from the spirit of the invention. This applies particularly to the use of plasticizers, cross-linking agents, additional binders such as synthetic polymers, coloring agents, surface coatings and the like.

The invention claimed is:

A molding composition comprising 50 to 90 wt. percent of a cellulosic filler and from 10 to 50 wt. percent of an asphalt separated from an asphaltic residuum charge stock by means of extraction with a normally gaseous liquid hydrocarbon solvent selected from the group consisting of propane, butane and mixtures thereof said asphalt containing 20 to 30 wt. percent of asphaltenes, 20–30 wt. percent resins and 40 to 60 wt. percent oil components.

References Cited by the Examiner

UNITED STATES PATENTS

| | | | |
|---|---|---|---|
| 2,035,122 | 3/1936 | Fulton et al. | 106—282 |
| 2,276,155 | 3/1942 | Carr | 208—6 |
| 2,774,724 | 12/1956 | Watson | 208—6 |
| 3,072,559 | 1/1963 | Corbett | 106—202 |

ALEXANDER H. BRODMERKEL, *Primary Examiner.*